E. BYLUND.
VEHICLE TIRE.
APPLICATION FILED NOV. 23, 1918.
1,422,921.
Patented July 18, 1922.
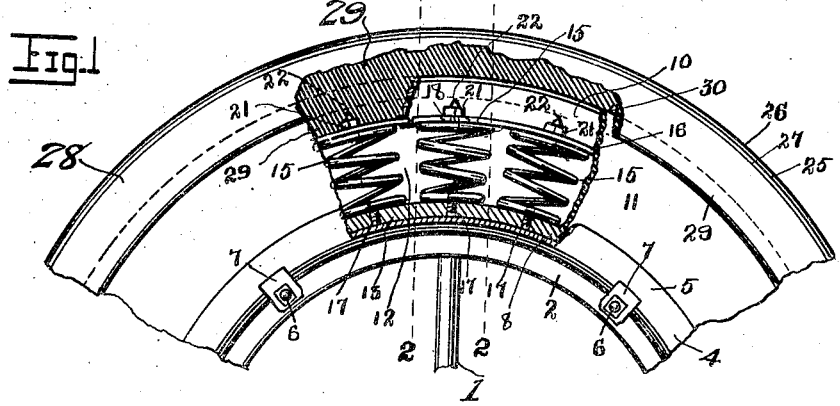
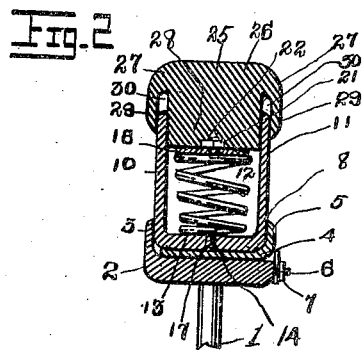
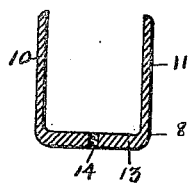
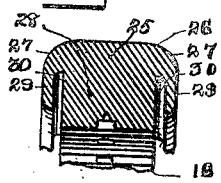
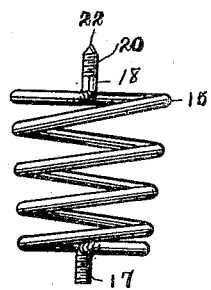
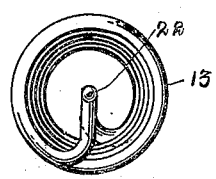
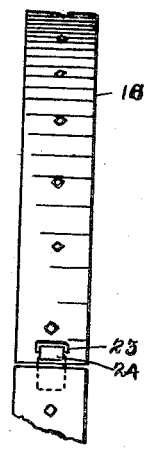
Eric Bylund
By D. R. O'Neail
His Attorney

UNITED STATES PATENT OFFICE.

ERIC BYLUND, OF WINNIPEG, MANITOBA, CANADA.

VEHICLE TIRE.

1,422,921. Specification of Letters Patent. Patented July 18, 1922.

Application filed November 23, 1918. Serial No. 263,885.

*To all whom it may concern:*

Be it known that I, ERIC BYLUND, subject of the King of Great Britain, residing at the city of Winnipeg, in the Province of Manitoba, in the Dominion of Canada, have invented certain new and useful Improvements in Vehicle Tires, of which the following is a specification.

This invention relates to vehicle tires and the object of the invention is to provide a resilient structure which may be substituted for pneumatic tires of the kind in common use on truck and pleasure automobiles and without any change whatever of the wheel structure. With this object in view the invention consists in the novel structure and combination of parts hereinafter first fully described in the following specification and then more particularly pointed out in the appended claims, reference also being had to the drawings forming part hereof, in which—

Fig. 1 is a side elevation showing a fragment of a tire and its connection with the vehicle wheel, portions of the outer side of the tire being broken away to more clearly illustrate its structure.

Fig. 2 is a cross section of the tire as it would appear taken between the lines 2—2 in Fig. 1.

Fig. 3 is a cross section of the grooved member as it appears in Fig. 2.

Fig. 4 is a cross section of the outer cover of the tire.

Fig. 5 is an enlarged side elevation of one of the springs forming the main resilient feature of the tire.

Fig. 6 is a top plan view of the spring shown in Fig. 5.

Fig. 7 is a fragment of the band in which the outer terminals of the springs are received.

In the drawings 1 indicates a spoke of a vehicle and 2 the rim or felly into which its outer end is received, the rim 2 being of the conventional type providing a flange 3 on one side, a ring 4 fitting over the base of the rim and furnishing a flange 5 on the opposite side of the wheel, the tire being received between the said flanges and the ring 4 detachably maintained in place by the bolts 6 and clips 7.

The tire proper comprises a circular base member 8 having its marginal portions turned out to provide spaced flanges 10 and 11 forming the sides of a groove 12, the bottom 13 of the groove being provided at spaced distances all around with interiorly screw threaded apertures 14.

A plurality of springs 15 are radially disposed in the groove 12 these being preferably coiled in convolutions of gradually increasing circumference to provide a taper to the spring conforming to the increase in diameter of the tire as it is built up from the base 13 of the groove 12. The convolutions of the springs most distant from each other preferably depart from the spirals to adapt them in the one instance to hug the bottom of the groove 12 and in the other instance to bear evenly against the inner periphery of the flat metallic band or ring 16, preferably of resilient quality, which encircles all the springs.

The terminals of the springs are curved inwardly to the centre and then turned out, to provide at the bottom on each, a screw threaded end 17 adapted to engage in the screw threaded apertures 14 in the base 13 of the groove 12, and at the top to provide an end, squared as at 18 for a distance equivalent to the thickness of the circular band 16, adapted to be received in the square apertures formed in the ring to receive them and so to prevent rotation of the springs after their lower ends have been screwed in the apertures in the bottom of the groove, the balance of the ends being screw threaded as at 20 to receive the nuts 21, and then pointed as at 22.

The band 16 is preferably of a width to fully cover the tops of the springs 15, and to facilitate the assembling of the parts, the said band may be formed with an eye 23 on one end and a hook 24 on the other end so that the ends may be connected after the band has been placed in position around the springs.

The band 16 forms a support for an outer cover 25 which is preferably solidly formed from a resilient material such as rubber, to have a tread portion 26 which may be rounded on the edges as shown at 27, an inwardly projecting central portion 28 adapted to exactly fit between the flanges 10 and 11 on the member 8 and to rest upon the band 16, and inwardly projecting side flanges or lips 29 spaced from the portion 28 to provide the grooves 30 in which are received the flanges 10 and 11, the said grooves being larger in circumference than the flanges 10 and 11 to allow of radial play of the flanges in the grooves as the tire gives under a load or shock.

The springs 15 may of course be made heavy or light to suit the requirements of the case under which the tires will operate and the weight or thickness of the outer cover also varied to suit.

The operation of the tire is intended to duplicate that of the pneumatic type which it displaces, but without the attendant drawbacks of puncture and blowout. The solid rubber outer cover is expected to absorb all shocks of a mild character, the springs coming into play when more violent shocks are encountered or heavy loads carried, and the member 8 gives stability to the entire structure.

Having thus fully described my said invention, what I claim is—

1. A vehicle tire comprising a rigid member adapted for detachable reception on the rim of a wheel and shaped to form a groove having parallel sides extending circumferentially therearound, a plurality of coiled springs secured in the groove and extending radially therearound, a resilient band surrounding the springs, a cushion surrounding the band, and grooves at the sides of the cushion forming pockets of greater circumferential dimension than the sides of the groove for the reception of the same.

2. A vehicle tire comprising a rigid member adapted for detachable reception on the rim of a wheel and shaped to form a groove therearound, a plurality of radially disposed coiled springs secured in the groove, a band surrounding the springs and arranged to maintain the same in position, the springs and band filling the groove for a portion of its depth, a cushion mounted on the band and extending circumferentially beyond the groove all around, and side grooves in the cushion for the reception of the sides of the rigid member.

In testimony whereof, I affix my signature.

ERIC BYLUND.